United States Patent
Kuźniar

(10) Patent No.: US 10,343,338 B2
(45) Date of Patent: Jul. 9, 2019

(54) DEVICE FOR CURING PIPELINE INNER RESIN LININGS

(71) Applicant: KANRES TECHNOLOGY, Bialobrzegi (PL)

(72) Inventor: Slawomir Kuźniar, Łańcut (PL)

(73) Assignee: Bolonia Servicios E Ingenieros, S.L., Madrid (ES)

( * ) Notice: Subject to any disclaimer, the term of this patent is extended or adjusted under 35 U.S.C. 154(b) by 0 days.

(21) Appl. No.: 15/864,242

(22) Filed: Jan. 8, 2018

(65) Prior Publication Data

US 2018/0194072 A1  Jul. 12, 2018

(30) Foreign Application Priority Data

Jan. 9, 2017  (EP) .................................... 17460001

(51) Int. Cl.
  *B29C 73/00*  (2006.01)
  *B32B 43/00*  (2006.01)
  (Continued)

(52) U.S. Cl.
  CPC .......... *B29C 65/14* (2013.01); *B29C 63/0021* (2013.01); *B29C 63/34* (2013.01);
  (Continued)

(58) Field of Classification Search
  CPC .... B29C 2035/0805; B29C 2035/0827; B29C 63/34; B29C 63/36; B29C 65/14;
  (Continued)

(56) References Cited

U.S. PATENT DOCUMENTS

| 2010/0051168 A1* | 3/2010 | Moeskjaer | ............ F16L 55/165 |
| | | | 156/64 |
| 2013/0010460 A1* | 1/2013 | Peil | ............ F21K 9/00 |
| | | | 362/217.14 |

FOREIGN PATENT DOCUMENTS

| DE | 102007038197 A1 * | 2/2009 | ............ F16L 55/165 |
| JP | 2008142996 A * | 6/2008 | |

(Continued)

*Primary Examiner* — Philip C Tucker
*Assistant Examiner* — Brian R Slawski
(74) *Attorney, Agent, or Firm* — Defillo & Associates, Inc.; Evelyn A Defilló

(57) ABSTRACT

The invention relates to a device for curing inner linings of pipelines introduced into them in the form of lining tubes impregnated with a resin. The device includes metal three-piece monolithic body (52) both of the two extreme cylindrical portions (53 and 54) of which have a diameter (Ø1) larger than the diameter (Ø1') of its middle cylindrical portion (56), whereas all components of the body are connected with each other detachably, and both of the two extreme portions (53 and 54) are provided on their cylindrical circumferences with a dozen or so longitudinal ribs (65) each distributed symmetrically on them along the circumferences and having an identical thickness (U) and height (V), and moreover, the ribs are provided with circumferential slit-shaped recesses (66) situated opposite from each other and oriented perpendicularly to horizontal axis (67) of the device forming thus profiles functioning as radiators (68) composed of individual segments (69) separated from each other with elongated recesses with an dilation angle (α) and with crosswise circumferential slit-shaped recesses (66), whereas the middle portion (56) of the body on its circumference with diameter (Ø1') has also a dozen or so flat facets-chords (74) evenly distributed along the circumference and separated from each other with radially oriented slit-shaped recesses (75) ending on solid core (Continued)

(64) of this portion of the body (52) in which power leads (80) are guided supplying electric current to LEDs (79) and to the front camera unit (40), said recesses forming profiled figures functioning as radiators (76) flat facets (74) of which are connected detachably with plastic strip-shaped plates (78) with LEDs (79) installed in them, and moreover, both of the two extreme portions (53 and 54) of the body (52) are provided with round axial holes (61) ending with bevelled chamfers (62) forming annular slots (63) situated between them and the solid core (64) of the middle portion (56) of the body, whereas the axial holes (61) are coaxial with holes (59) of both of the two profiled shields (58) connected detachably with outer faces of both of the two extreme portions (53 and 54) of the body (52) of the device.

4 Claims, 4 Drawing Sheets

(51) Int. Cl.
| | | |
|---|---|---|
| *B29C 65/00* | (2006.01) | |
| *B32B 37/00* | (2006.01) | |
| *B32B 38/04* | (2006.01) | |
| *B27G 11/02* | (2006.01) | |
| *B29C 65/02* | (2006.01) | |
| *B31F 5/04* | (2006.01) | |
| *F16L 55/16* | (2006.01) | |
| *H01J 1/02* | (2006.01) | |
| *H01J 7/24* | (2006.01) | |
| *H01J 61/52* | (2006.01) | |
| *H01K 1/58* | (2006.01) | |
| *H01J 1/62* | (2006.01) | |
| *H01J 63/04* | (2006.01) | |
| *F21V 21/00* | (2006.01) | |
| *F21V 29/00* | (2015.01) | |
| *F21S 4/00* | (2016.01) | |
| *B29C 65/14* | (2006.01) | |
| *F16L 55/40* | (2006.01) | |
| *F16L 55/165* | (2006.01) | |
| *B32B 41/00* | (2006.01) | |
| *B32B 3/30* | (2006.01) | |
| *B29C 63/00* | (2006.01) | |
| *B29C 63/34* | (2006.01) | |
| *F16L 101/10* | (2006.01) | |
| *B29L 23/00* | (2006.01) | |
| *B29C 35/08* | (2006.01) | |

(52) U.S. Cl.
CPC ............ *B32B 3/30* (2013.01); *B32B 41/00* (2013.01); *F16L 55/165* (2013.01); *F16L 55/40* (2013.01); *B29C 65/1406* (2013.01); *B29C 66/532* (2013.01); *B29C 66/61* (2013.01); *B29C 2035/0827* (2013.01); *B29L 2023/22* (2013.01); *B32B 2597/00* (2013.01); *F16L 55/1653* (2013.01); *F16L 2101/10* (2013.01)

(58) Field of Classification Search
CPC . B29C 65/1406; B29C 65/48; B29C 65/4845; B29C 66/5221; B29C 66/612; B29C 66/632; B29C 73/04; B29C 73/10; B29C 73/12; B29C 73/24; B29C 73/34; F16L 55/165; F16L 55/1653; F16L 55/18; F16L 2101/10; F16L 55/26
USPC ............ 156/60, 71, 94, 156, 196, 199, 212, 156/275.5, 275.7, 285, 287, 293, 294, 156/307.1, 307.3, 349, 379.6; 138/37, 138/38; 405/184.2; 257/99, E33.058; 313/498, 512, 45, 500; 362/84, 157, 184, 362/185, 217.01, 217.1, 217.14, 218, 219, 362/225
See application file for complete search history.

(56) References Cited

FOREIGN PATENT DOCUMENTS

| | | | | |
|---|---|---|---|---|
| JP | 2008175381 A | * | 7/2008 | ............ F16L 55/165 |
| JP | 2008265245 A | * | 11/2008 | |
| WO | WO-2009103398 A1 | * | 8/2009 | ............ B29C 35/10 |

* cited by examiner

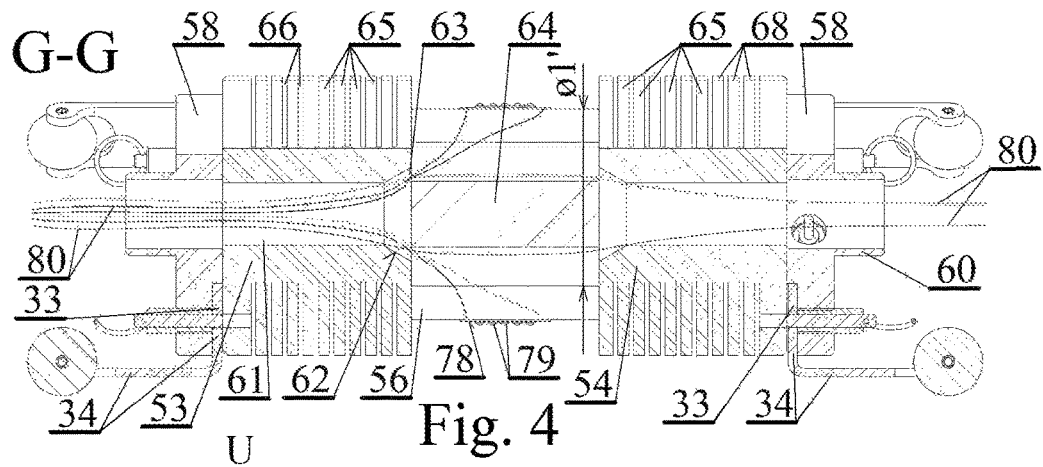
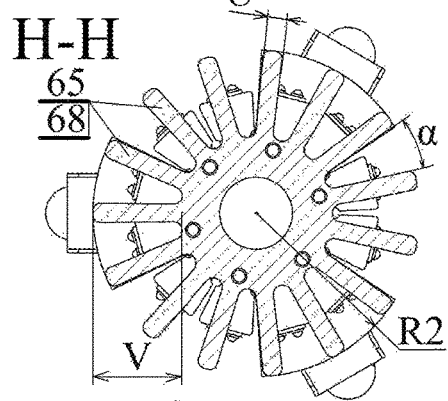
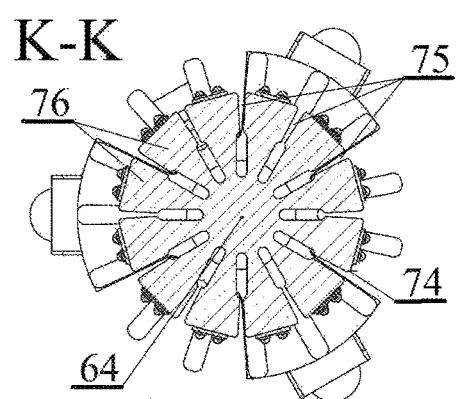
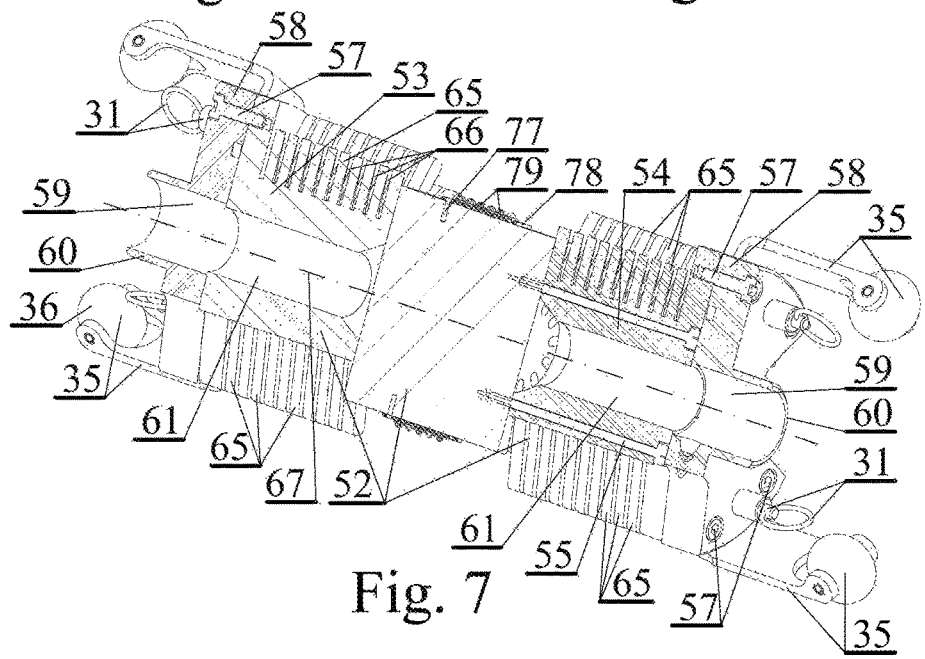

M-M

Detail "N"

DEVICE FOR CURING PIPELINE INNER RESIN LININGS

FIELD OF THE INVENTION

The subject of the invention is a device for curing inner linings in pipelines introduced into them in the form of lining tubes impregnated with a resin.

Worn-out and leaking pipelines, including sanitary sewerage systems, deteriorated usually because of insufficient maintenance, are subject to renovation by means of lining tubes impregnated with resins, dragged into the pipeline and then bonded to inner surface of the pipeline in order to eliminate leakage and soaking of the carried liquids through the pipeline walls showing destructive impact on natural environment.

BACKGROUND OF THE INVENTION

From Polish patent description No. PL 202527 known is a method of and a set of devices for renovation of pipelines, where the renovation method according to that invention is characterised in that a liming is placed inside the pipeline and then pressed against the inner surface of the pipeline by means of rings, while ends of the lining are sealed with the use of any known methods by means of cuffs. The lining is introduced in parts which are then joined with the use of any known method by welding or gluing.

The lining in the form of a plastic sleeve is joined by means of double-run thermal welding, whereas the welds are being made at definite distances from each other. Pressing of the lining against inner surface of the pipeline with the use of rings is achieved by expanding the rings which are expanded with the use of a cylinder, and when the rings are expanded, their position is fixed and they are joined permanently with the lining.

Further, the set for renovation of pipelines by means of from-inside method according to the above-quoted invention is characterised in that the set comprises a lining and a set of expandable rings distributed axially along the pipe axis and permanently joined with the lining which has the form of plastic film or the form of plates joined by means of any known methods, whereas the ring comprises an expanding element.

Pipeline renovation technologies based on lining the pipes with a resin-impregnated tube are described in numerous patents and patent applications, with the so-called inversion technique being described in some of them. Other patent descriptions, e.g. WO2004/104469, reveal a method consisting in dragging a resin lining into pipeline, whereas hardening or curing of the resin, especially thermosetting one, consists mainly in the use of hot water or hot steam.

Further, patent description WO93/15131 reveals a pipeline renovation method in which ultrasonic radiation is used to cure resin lining. To this end, a movable device is used equipped with ultrasonic transducers, introduced into and translated along the pipeline as well as the catalytic component of the resin contained in micro-capsules which are torn apart by energy of the ultrasonic field. The resin tube constituting the lining is placed in pipeline and then cured by means of ultrasonic energy in order to release the curing catalyst.

A newer method of curing tubular resin lining on inner surface of pipeline consists in the lining being irradiated with UV waves, with an vacuum electron lamp being used for this purpose as a source of radiation introduced into the pipeline and said radiation resulting in the resin lining being cured by means of the device emitting such ultraviolet radiation.

However, it turned out that despite a number of good points characterising this method of curing resin pipeline linings, including minimisation of energy consumption compared with conventional method of curing resin linings by means of hot water of steam, the device has a serious flaw consisting in that UV radiation emitted from the device is very harmful to health and threatens lives of workers operating the devices.

From patent description WO2005/103121 known is a photosetting composition of resins which is cured by means of irradiation with visible light, especially light with wavelength of about 450 nm, i.e. blue light, whereas the relevant patent application refers to different techniques encompassing the prior art available at that time, describing also the favourable features of photosetting.

Further, from patent description of European patent No. EP 2129956 B1 known are two design versions of the device for curing pipeline inner linings based on the use of light emitting diodes (LEDs) which, contrary to UV-radiation emitting devices based on application of vacuum tubes, are characterised with high stability and substantially constant efficiency of energy or power emission level throughout the LED service life, whereas to increase effectiveness of these devices, they are equipped with an integrated fluid-based cooling systems. The device according to the first version of embodiment of this invention has a central eight-section (octahedral) segment of the device's housing provided on both ends with annular spacers, attached by means of fasteners, whereas the spacers with outer diameter adjusted to the inner diameter of pipeline lining have flange-shaped protrusions offset outside with holes for said fasteners, and within the vicinity of at least one of the spacers mounted is a fan forcing the flow of compressed air via inner axial hole in said segment of the device's housing.

The fan cools LEDs contributing to dissipation of heat onto inner finned radiators situated opposite the LEDs. Further, the rear sleeve-shaped spacer situated on the fan side is equipped with a Cardan joint allowing to couple the above-described single devices with a second analogous device. Moreover, each of the eight sections of the housing segment is equipped with a printed circuit board PCB with twelve diodes mounted on it, so that the housing segment has a total of 96 diodes, of which 95 are light-emitting diodes (LEDs) and the one is a temperature or infrared detecting diode used to monitor temperature of inner surface of the cured pipeline lining, and further, PCB holds a temperature sensor to prevent increase of LED temperature above an admissible maximum level, said sensor being connected in series with light-emitting diodes and used to deactivate them in case of detecting temperature values exceeding those pre-assumed to be the maximum admissible ones. Furthermore, the front portion of each profiled section of the device's housing segment has a cavity in which a transparent shield is placed to provide mechanical protection for LEDs placed under the cover, whereas opposite this protective shield, the above-mentioned printed circuit board PCB is placed with its front face oriented opposite the LEDs, coupled by means of the thermal conductivity with finned metallic element (radiator) radiating the heat out and channelling the heat generated by the light emitting inside the housing segment provided with a straight-through duct in which compressed air is supplied under pressure through said housing segment to cool the finned metallic elements and thus cooling LEDs emitting electromagnetic radiation.

Each of the eight profiled sections of the device's housing segment is positioned in a way allowing to connect it to the neighbouring analogous profiled housing section and thus obtain the octahedral segment of the housing, whereas side surfaces of each section, which are to be connected to side surfaces of neighbouring sections of the housing, are provided with semicircular hollows, allowing to interconnect the eight profiled sections of the housing with each other by means of straight-through pins inserted in them.

In another version of embodiment of the device according to the above-quoted invention, the device comprises two housing segments, both having the shape of a circular cylinder, each of the segments of the housing being assembled out of six arched sections and equipped with twelve LEDs and six front elements with the profile of a ring segment, and the segments being connected with each other by means of spacers and securing pins so that the two housing segments connected with each other have a total of twelve sections containing a total one hundred and forty four LEDs.

SUMMARY OF THE INVENTION

The objective of the present invention is to provide a simple and compact design for a device a device for curing inner pipeline linings impregnated with resins cured by means of UV radiation having a monolithic or sectional three-section body designed substantially in the cylindrical form, passively cooled in its middle section equipped with light emitting diodes (LEDs) distributed along the whole of its circumference which is less than this of the two extreme sections. The device should be designed in a way allowing to use thinner and therefore less expensive power leads, offer lower consumption of electric power, and have a specific structure of its radiator suitable for passive cooling and allowing to eliminate the commonly employed cooling with the use of compressed air; further, the device should allow to cure linings in pipeline sections several times longer compared to devices of that type know to date, including pipelines up to 1000-m long. A further objective of the invention is to equip the body of the device with such a number of LEDs with such a power equalling preferably 12×50 W which would allow, depending on needs, to switch them on and off in a sequence or, alternatively, switch all the LEDs on at a predetermined power, e.g. 33% of rated power of 50 W for a half of all LEDs and 67% for the other half, or change the level of power emitted by individual LEDs alternately, to ensure that the lining is irradiated continuously and along the whole of its circumference. Another advantageous objective of the invention is to develop such design of the above—described device which would allow to adjust the nominal radiation power for each of the devices making up an assembly of a number of individual devices to the value determined by cooling power of its radiator, e.g. to the 300 W by generating the power of 200 W for one second and 400 W for another second or in any other combination of powers and operating times allowing to obtain a required rated power as an arithmetic average, obtaining thus higher energy radiated on given surface of the lining.

On the other hand, the technical problem that needed to be solved consisted in developing a design of a device equipped with a three-piece monolithic or sectional body equipped with LEDs the structure of which would allow to concentrate the whole power of the LEDs on the whole circumference of the circle and increase effectiveness of cooling by providing radiators with increased cooling surface, and thus achieve the assumed objective of the invention.

The essential feature of the device for curing pipeline inner lining with the use of a lining tube containing a resin-based means cured by means of electromagnetic radiation consists in that it has a metal three-piece monolithic body, both of the two extreme cylindrical portions of which have a diameter larger than the diameter of its middle cylindrical portion, whereas all components of the body are connected with each other detachably, and both of the two extreme portions are provided on their cylindrical circumferences with a dozen or so longitudinal ribs each distributed symmetrically on them along the circumferences and having an identical thickness and height, and moreover, the ribs are provided with circumferential slit-shaped recesses situated opposite from each other and oriented perpendicularly to horizontal axis of the device functioning as radiators composed of individual segments separated from each other with elongated recesses with an dilation angle and with crosswise circumferential slit-shaped recesses. Further, the middle portion of the body on its circumference has also a dozen or so flat facets-chords evenly distributed along the circumference and separated from each other with radially oriented slit-shaped recesses ending on solid core of this portion of the body in which power leads are guided supplying electric current to LEDs and to the front camera unit, said recesses forming profiled figures functioning as radiators flat facets of which are connected detachably with plastic strip-shaped plates with LEDs installed in them. Moreover, both of the two extreme portions of the body (52) are provided with round axial holes ending with bevelled chamfers forming a circumferential slit situated between them and the solid core of the middle portion (56) of the body, whereas the holes are coaxial with holes of both of the two profiled shields connected detachably with outer faces of both of the two extreme portions of the body of the device. Moreover outer faces of both of the two extreme portions of the body are connected detachably with profiled shields which, on their outer surfaces, are provided with three recesses in the form of isosceles trapeziums with open upper sides symmetrically distributed on circumferences of circles forming thus three segments on each of the shields, with a sensor (73) of temperature of the cured lining tube being fixed to bottom of one of the recesses and straight-through holes (59) provided in the shields on their symmetry axes extended with threaded sleeve connectors (60) protruding outside. Preferably, the plastic strip-shaped plates in which LEDs are installed have a length shorter than the length of the middle portion of the device body.

Depending on length and diameter of the cured pipeline lining, the device according the invention constitutes an assembly of several or a dozen or so individual devices in which sleeve connectors of the profiled shields are connected with each other detachably by means of connection sleeves, and moreover, the front sleeve connector of the leading device in the assembly is provided with a blanking element onto which a front camera unit is screwed comprising a cylindrical-sleeve body the face of which connected is with a profiled sleeve element having a lid provided with an axial hole in which the face of the front monitoring camera is mounted surrounded with a counterweight and LEDs mounted around the camera, whereas the connection sleeve connected with the unit of rear camera is screwed onto the threaded sleeve connector of the trailing device of the assembly, said unit being equipped with power supply connector and LEDs.

By giving the device according to the invention the form of a substantially cylindrical monolithic cylindrical body provided with a dozen or so flat facets evenly distributed long its circumference forming thus, on one hand, bases on which LEDs can be installed and, on the other, upper portions of radiators with highly developed sides surfaces separated from each other by with slit-shaped recesses, it become possible to simplify significantly the structure of the device and reduce the number of its components. The three-piece body may be fabricated with the use of inexpensive method such as liquid blast cutting or wire spark machining which reduces significantly the labour intensity and the manufacturing cost of the device. Another advantage of the invention consists in that specifically designed and well-developed surface of the radiators allows to cool the device passively and eliminate the necessity to supply it with compressed air for cooling which allows to cure the resin lining at larger distances and at higher speeds compared to other known devices of that type in which, in contrast to the above-described cooling air circulation pattern, air is supplied under pressure and cools both diodes and the radiator. Moreover, in the solution according to the present invention, each separate profile of the radiator to which LEDs-carrying plates are fixed, is connected with solid core of the device body on which a temperature sensor which, regardless of number, power, and configuration of light emitting diodes installed, indicates temperature of the whole device thus preventing both the device and the pipeline from damage or possible fire. An essential merit of the device is also that each of the LED-carrying plates is mounted on a separate radiator connected with the device's body core creating thus identical operating and cooling conditions for each plate. Moreover, arranging the LED-carrying plates in two rows with several plates in each row on separate radiators and with several LEDs on each plate situated next to each other offers the possibility to switch, depending on needs, the LEDs on and off alternately according to precisely defined schedule and this way, to deliver the required dose of electromagnetic radiation at lower power consumption which additionally protects the device from overheating, which is an advantageous feature especially in pipelines with small diameters and thin lining walls. Sequential switching the LEDs on and off creates an impression of spinning and additionally, offers the possibility of supplying precisely the required amount of radiation onto given surface to be cured.

On the other hand, thanks to the much lower emission of waste heat compared to vacuum lamps which operate at temperatures up to 950° C., such trains of individual device can be used in pipelines with small diameters without risk of fire or lining sleeve overheating. In particular, in lining sleeves with small diameters (DN150) it is possible to use LEDs emitting the total power corresponding to this of a vacuum lamp with rated power of about 1000 W which can be used only in pipelines with diameters DN600 and above, whereas the speed of the sleeve lining curing process rate can be increased several times compared to traditional methods.

BRIEF DESCRIPTION OF THE DRAWINGS

The subject of the invention has been shown on drawings, of which

FIG. 4—the same device in axial section along line GG;

FIG. 5—the same device in cross-section along line HH;

FIG. 6—the same device in cross-section along line KK;

FIG. 7—the same device in axial section in a perspective view;

DETAILED DESCRIPTION OF THE INVENTION

Figure 1:
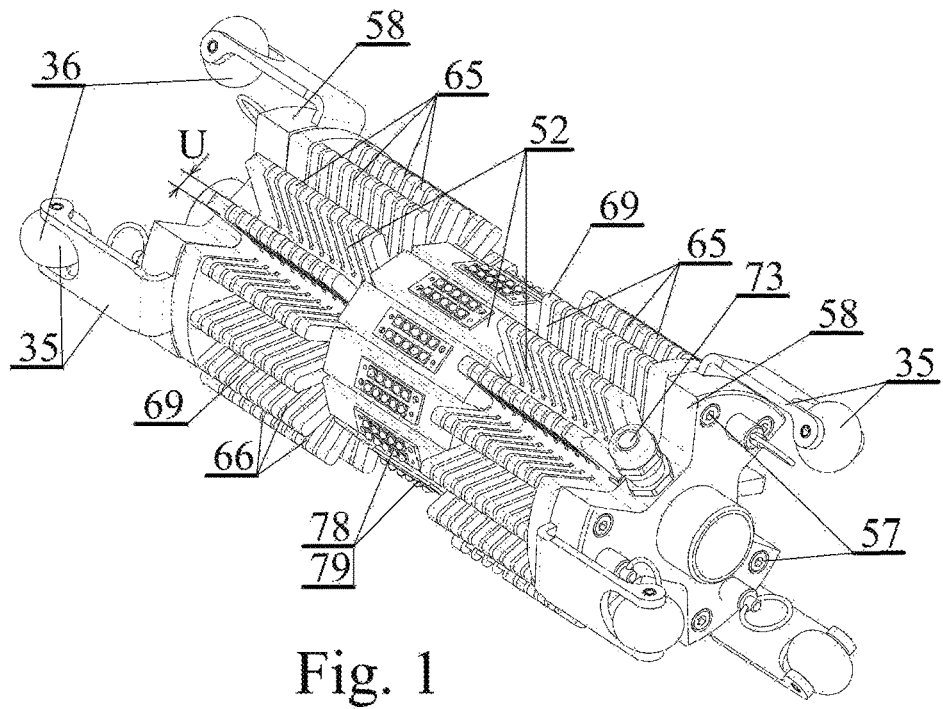
FIG. 1—the first variant of embodiment of the device for curing resin lining with its body provided with transversely oriented radiator ribs, in a perspective view.
Figure 2:
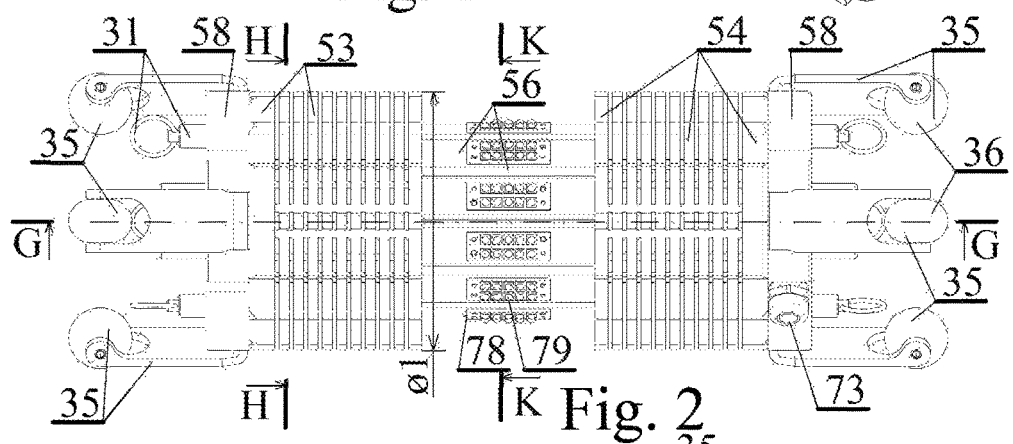
FIG. 2—the same device in the front view.
Figure 3:
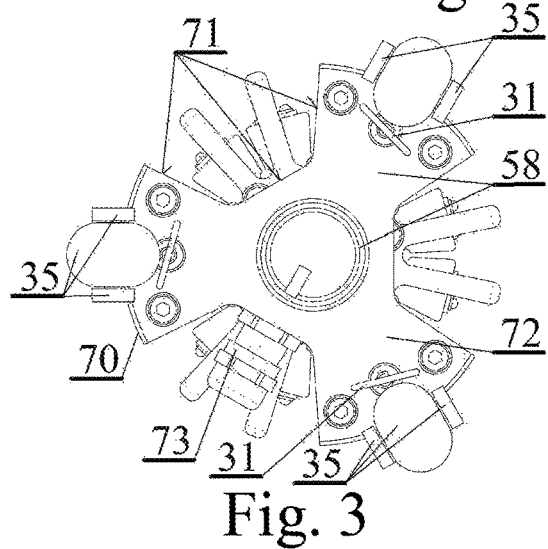
FIG. 3—the same device in the side view.
Figure 8:
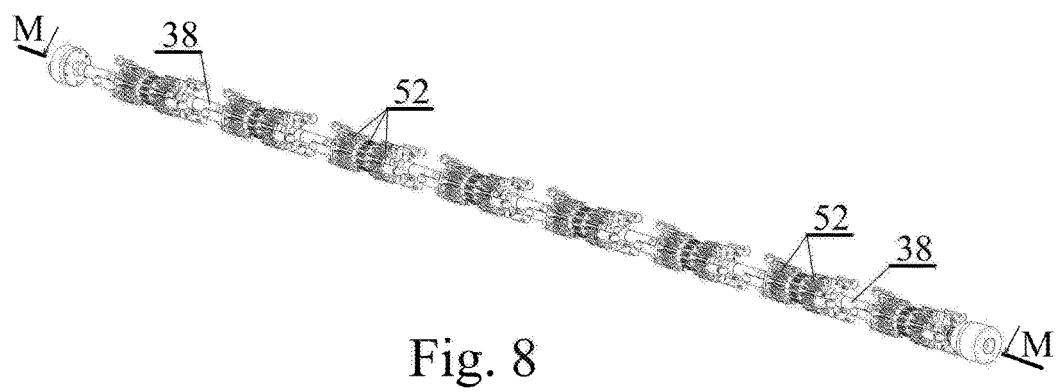
FIG. 8—a working assembly comprising eight identical devices connected with each other by means of connection sleeves, ended at the front and at the end with units equipped with a front monitoring camera and a rear monitoring camera, respectively, in a perspective view.

The device for curing pipeline inner resin linings and an assembly of such devices connected functionally with each other shown in FIGS. 1-12 comprises a three-piece body 52, two identical extreme portions 53 and 54 with diameter Ø1 of which are joined by means of bolts 55 with the middle portion 56 of the body with diameter Ø1' smaller than the diameter Ø1 of both of the two extreme portions to outer faces of which, by means of bolts 57, attached are profiled shields 58, equipped with rope eyelets 31 and vehicle assemblies 35, whereas both of the two extreme portions 53 and 54 of the body 52 are provided with round axial holes 61 ending with bevelled chamfers 62 forming annular slots 63 situated between them and the solid core 64 of the middle portion 56 of the body 52 constituting a continuation of axial holes 59 of the two shields and their threaded sleeve connectors 60.

Moreover, on cylindrical pitch circles of the extreme portions 53 and 54 of the body 52 there are fifteen longitudinal ribs 65 distributed symmetrically along the circles, i.e. with the pitch $\alpha=24°$, with identical thickness U and height V equalling about 50% of length of the radius R2 of the extreme body portions, and moreover, all these longitudinal ribs 65 are provided with circumferential slit-shaped recesses 66 situated opposite from each other and oriented perpendicularly to horizontal axis 67 of the device forming thus profiles functioning as radiators 68 composed of individual segments 69 separated from each other with elongated recesses with an dilation angle $\alpha$ and with crosswise circumferential slit-shaped recesses 66. Outer surfaces of the two identical shields 58 of the device are provided with three profiled recesses 71 symmetrically distributed on circumferences of circles 70 and having the shape of isosceles trapeziums with open upper sides forming thus three segments 72 on each of the shields, with a sensor (73) for controlling temperature of the cured lining tube (sleeve) being fixed to bottom of one of the recesses. Further, the segments of the two shields 58 are provided with rope eyelets and vehicle assemblies 35 connected with them, so that in rectangular recesses between the shields and upper portions of outer surfaces of portions 53 and 54 of the body 52 fixed are vertical legs 33 of angle bars 34 of vehicle assemblies 35 equipped with spherical rolling elements 36.

On the other hand, the middle portion 56 of the body 52 has twelve evenly distributed flat facets-chords 74 on its circumference with diameter Ø1' separated from each other with radially oriented slit-shaped recesses 75 ending on the solid core 64 of this body portion forming thus twelve profiled figures functioning as middle-portion radiators 76 to the flat facets 74 of which and on a portion of their length, attached by means of screws 77 are plastic strip-shaped plates 78 with LEDs 79 installed in them in two rows, five LEDs in each row, as a result of which there is 120 LEDs 79 installed in total on the whole circumference of middle portion of the body 52, the LEDs being supplied with electric current by means of electric leads 80 connected to them and guided from outside via straight-through holes 59 in shields 58. Further, annular slots 63 are formed between axial holes 61 of the extreme portions 53 and 54 of the body 52 and core 64 of the middle portion 56 of the body.

Figure 9:
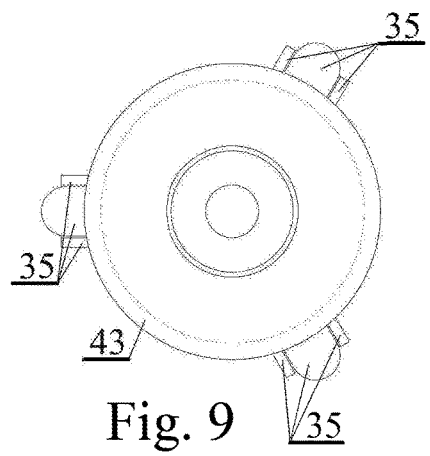
FIG. 9—an enlarged view of the same assembly as seen from the front side.
Figure 10:
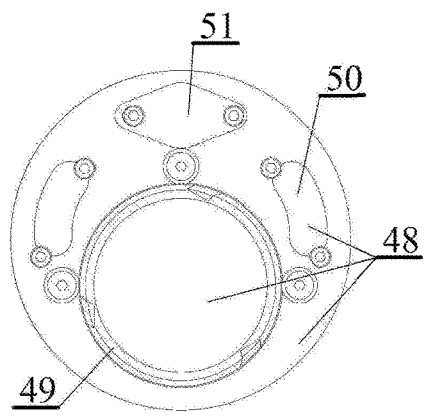
FIG. 10—an enlarged view of the same assembly as seen from the front side.
Figure 11:
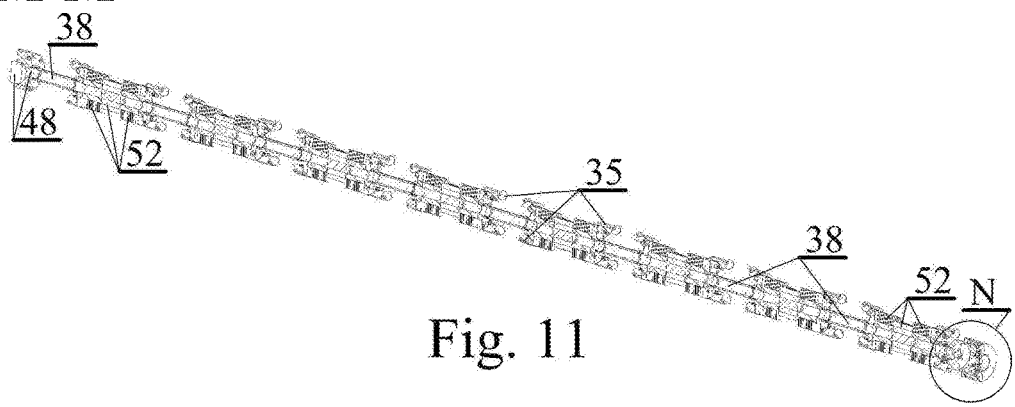
FIG. 11—the same assembly of eight devices in axial section along line MM.
Figure 12:
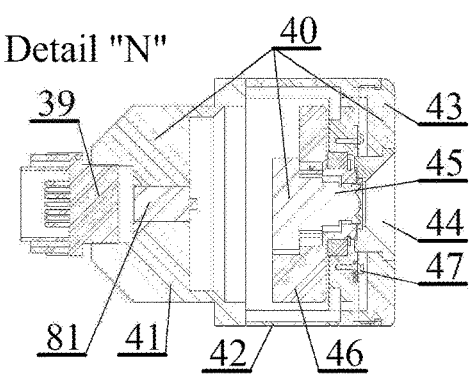
FIG. 12—enlarged detail "N" of the assembly of eight devices.

Depending on length and diameter of the cured pipeline lining, the curing is performed with the use of a single device shown in FIGS. 1-7 or few, preferably eight of such devices as shown in FIGS. 8-12. Sleeve connectors 60 of shields 58 are connected with each other by means of connection sleeves 38 screwed on them, whereas the threaded sleeve connector 60 of the leading device is connected, with a blanking element 39 with the front camera unit 40 screwed on it. The unit comprises a cylindrical-sleeve body 41, face of which is connected with a profiled sleeve element 42, onto the end of which screwed is a lid 43 with an axial hole 44 which houses the face of front monitoring camera 45 mounted inside the sleeve element and surrounded with a counterweight 46 keeping the camera in horizontal position and with LEDs 47 illuminating the field of view of the camera, whereas an axial hole provided in the cylindrical-sleeve body houses a rotary electric connector 81. Further, a connection sleeves 38 is screwed onto the threaded sleeve connector 29 of the trailing device with onto which in turn the rear camera unit 48 is screwed comprising rear camera 51 and equipped with connector 49 to supply power to LEDs 50 illuminating the field of view of the rear camera 51 as shown in FIGS. 9, 10, and 12.

In another example embodiment of the device according to the invention, LEDs 24 emitting electromagnetic radiation with wavelength 500 nm were used.

In yet another example embodiment of the device according to the invention, a working assembly is employed comprising twelve individual devices also connected by means of connection sleeves 38.

LEGEND

1—body
2—body, extreme portion
3—body, extreme portion
4—body, middle portion
5—flat facets-chords
6—slit grooves
7—horizontal axis
8, 8'—circular ducts
9—profiled FIGS.
10—rectangular grooves
11—rounded bottoms of grooves
12—ribs
13, 13'—trapezoidal FIGS.
14—trapezoidal figures, wider sides
15, 15'—grooves
16, 16'—ribs
17—radiators
18—flat facets-chords
19—slit grooves
20—profiled FIGS.
21—radiators
22—screws
23—plastic strip-shaped plates
24—LEDs
25—bolts
26—profiled shields
27—profiled shields, profiled segments
28—straight-through holes
29—sleeve connectors
30—outer threads
31—rope eyelets
32—rectangular recesses in shields
33—angle bar elements, vertical arms
34—angle bar elements
35—vehicle assemblies
36—vehicle assemblies, spherical rolling elements
37—power leads
38—connection sleeves
39—blanking element
40—front camera unit
41—front camera unit, cylindrical-sleeve body
42—profiled sleeve element
43—lid
44—axial hole
45—monitoring camera face
46—counterweight
47—front camera, illuminating LEDs
48—rear camera unit
49—power supply connector
50—rear camera, illuminating LEDs
51—rear camera
52—three-piece body
53—body, extreme portion
54—body, extreme portion
55—screws
56—body, middle portion
57—bolts
58—profiled shields
59—shields, axial holes
60—threaded sleeve connectors
61—body, extreme portions, axial holes
62—bevelled chamfers
63—annular slot
64—body, middle portion, core
65—ribs
66—slit-shaped recesses
67—horizontal axis
68—radiators
69—radiators, individual segments
70—shield circle, circumference
71—profiled recesses
72—shield segments
73—temperature sensor
74—body, middle portion, flat facets
75—slit-shaped recesses
76—body, middle portion, radiators
77—screws
78—plastic strip-shaped plates
79—LEDs
80—electric leads
81—rotary electric connector

The invention claimed is:

1. A device for curing pipeline inner linings with the use of a lining tube containing a resin cured by electromagnetic radiation, the device comprising:
a metal three-piece body comprising two extreme cylindrical portions (53, 54) and a middle cylindrical portion (56), the two extreme cylindrical portions (53, 54) having a diameter (Ø1) larger than a diameter (Ø1') of the middle cylindrical portion (56), the middle cylindrical portion having a polyhedral form including flat faces, wherein the flat faces are equipped with light-emitting diodes (LEDs) generating the electromagnetic radiation by emitting waves with wavelengths of 200-500 nm to cure the resin, wherein the body is provided with ribbed radiators to dissipate heat generated by the LEDs, wherein faces of said radiators are covered with side shields equipped with a sensor to monitor a temperature of the cured lining tube, with vehicle assemblies distributed evenly on circumferences of the side shields, with rope eyelets, with monitoring cameras, and with leads supplying power to the LEDs, wherein all components of the body are detachably connected with each other and the extreme portions (53, 54) are provided on cylindrical surfaces thereof with a plurality of longitudinal ribs (65) distributed symmetrically along the circumferences of the two extreme cylindrical portions and having an identical thickness (U) and height (V), wherein the ribs are provided with circumferential slit-shaped recesses (66) situated opposite from each other and oriented perpendicularly to a horizontal axis (67) of the device thus forming profiles functioning as radiators (68) composed of individual segments (69) separated from each other with elongated recesses with a dilation angle ($\alpha$) and with crosswise circumferential slit-shaped recesses (66), wherein the middle portion (56) of the body on a circumference thereof with diameter (Ø1') has a plurality of flat faces (74) evenly distributed along the circumference of the middle cylindrical portion and separated from each other with radially oriented slit-shaped recesses (75) ending on a solid core (64) of the middle cylindrical portion of the body (52) in which power leads (80) are guided supplying electric current to the LEDs (79) and to a front camera unit (40), said recesses of the middle cylindrical forming profiled figures functioning as radiators (76) the flat faces (74) of which are connected detachably with plastic strip-shaped plates (78) with LEDs (79) installed therein, and wherein both of the two extreme portions (53 and 54) of the body (52) are provided with round axial holes (61) ending with bevelled chamfers (62) forming annular slots (63) situated between the two extreme cylindrical portions and the solid core (64) of the middle portion (56) of the body, wherein the axial holes (61) are coaxial with holes (59) of the side shields (58) connected detachably with outer faces of both of the two extreme portions (53 and 54) of the body (52) of the device.

2. The device according to claim 1, wherein the side shields covering faces of the radiators are profiled shields connected detachably the with outer faces of the two extreme portions (53 and 54) of the body (52), and wherein outer surfaces of the profiled shields (58) are provided with three recesses (71) in the form of isosceles trapeziums with open upper sides symmetrically distributed on circumferences of circles (70) thus forming three segments (72) on each of the shields, with a sensor (73) of temperature of the cured lining tube being fixed to a bottom of one of the recesses of the profiled shields and straight-through holes (59) provided in the shields on axes of symmetry thereof extended with threaded sleeve connectors (60) protruding outside the profiled shields.

3. The device according to claim 2, including an assembly of a plurality of the devices in which some of the sleeve connectors (60) of the profiled shields (58) are connected with each other detachably by means of connection sleeves (38), and wherein a front sleeve connector of a leading device in the assembly is provided with a blanking element (39) onto which the front camera unit (40) is screwed, the front camera unit comprising a cylindrical-sleeve body (41), a face of the cylindrical-sleeve body being connected with a profiled sleeve element (42) having a lid (43) provided with an axial hole (44) in which a face (45) of a front monitoring camera is mounted surrounded with a counterweight (46) and LEDs (47) arranged around the front monitoring camera, wherein a connection sleeve (38) connected with a rear camera unit (48) is screwed onto a threaded sleeve connector (29) of a trailing device of the assembly, said rear camera unit being equipped with a power supply connector (49) and LEDs (50).

4. The device according to claim 1, wherein the plastic strip-shaped plates (78) with LEDs (79) installed therein have a length shorter than a length of the middle portion (56) of the body (52).

* * * * *